US012526383B1

United States Patent
Scarangella et al.

(10) Patent No.: US 12,526,383 B1
(45) Date of Patent: Jan. 13, 2026

(54) SYSTEMS AND METHODS FOR SECURELY CAPTIONING VIDEO CALLS

(71) Applicant: Meta Platforms, Inc., Menlo Park, CA (US)

(72) Inventors: Jacqueline Scarangella, New York, NY (US); Andrew Hsieh, San Jose, CA (US); Ping-Chen Su, Kirkland, WA (US); Khaled Kyle Wong, Seattle, WA (US); Sushant Shashikant Rao, Bothell, WA (US); Kirollos Risk, Walnut Creek, CA (US)

(73) Assignee: Meta Platforms, Inc., Menlo Park, CA (US)

( * ) Notice: Subject to any disclaimer, the term of this patent is extended or adjusted under 35 U.S.C. 154(b) by 340 days.

(21) Appl. No.: 18/051,886

(22) Filed: Nov. 2, 2022

(51) Int. Cl.
*H04L 65/403* (2022.01)
*G10L 15/26* (2006.01)
*H04N 7/14* (2006.01)
*H04N 7/15* (2006.01)

(52) U.S. Cl.
CPC ............ *H04N 7/147* (2013.01); *G10L 15/26* (2013.01); *H04L 65/403* (2013.01); *H04N 7/15* (2013.01)

(58) Field of Classification Search
CPC . H04N 7/147; H04N 7/14; H04N 7/15; G10L 15/26; H04L 65/403
See application file for complete search history.

(56) References Cited

U.S. PATENT DOCUMENTS

| | | | |
|---|---|---|---|
| 6,252,544 B1 * | 6/2001 | Hoffberg | H04B 7/18576 701/445 |
| 10,992,793 B1 * | 4/2021 | Medley | H04M 1/576 |
| 11,924,582 B2 * | 3/2024 | Mahadeva | G06V 20/46 |
| 2002/0150097 A1 * | 10/2002 | Yen | H04L 9/0833 370/399 |
| 2002/0161578 A1 * | 10/2002 | Saindon | G06F 40/58 704/235 |
| 2004/0111739 A1 * | 6/2004 | Winegard | H04N 21/4408 725/31 |
| 2007/0143103 A1 * | 6/2007 | Asthana | H04M 3/567 704/200 |
| 2011/0246172 A1 * | 10/2011 | Liberman | H04M 3/56 348/14.09 |
| 2014/0195227 A1 * | 7/2014 | Rudzicz | G10L 21/003 704/231 |
| 2019/0149347 A1 * | 5/2019 | Mcardle | H04W 12/06 709/204 |
| 2020/0028817 A1 * | 1/2020 | Ramakrishnan | H04L 51/02 |
| 2020/0084505 A1 * | 3/2020 | Reid | H04N 21/4396 |

(Continued)

*Primary Examiner* — Quoc D Tran
(74) *Attorney, Agent, or Firm* — EVERSHEDS SUTHERLAND (US) LLP

(57) ABSTRACT

A computer-implemented method for securely captioning video calls may include (i) detecting, by a messenger application executing on a client device, speech captured by a microphone of the client device and video of a speaker of the speech being captured by a camera of the client device, (ii) parsing, by the messenger application on the client device, the speech to create a transcript of the speech, and (iii) transmitting, by the messenger application on the client device, the transcript of the speech to an additional device for display to a user of the messenger application in combination with the video of the speaker. Various other methods, systems, and computer-readable media are also disclosed.

20 Claims, 8 Drawing Sheets

(56) References Cited

U.S. PATENT DOCUMENTS

| | | | |
|---|---|---|---|
| 2021/0074298 A1* | 3/2021 | Coeytaux | H04N 7/147 |
| 2023/0164296 A1* | 5/2023 | Chang | G06F 3/0488 |
| | | | 348/14.09 |
| 2023/0419967 A1* | 12/2023 | Hornberger | G10L 15/26 |
| 2024/0214519 A1* | 6/2024 | Pati | H04N 7/147 |

* cited by examiner

SYSTEMS AND METHODS FOR SECURELY CAPTIONING VIDEO CALLS

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
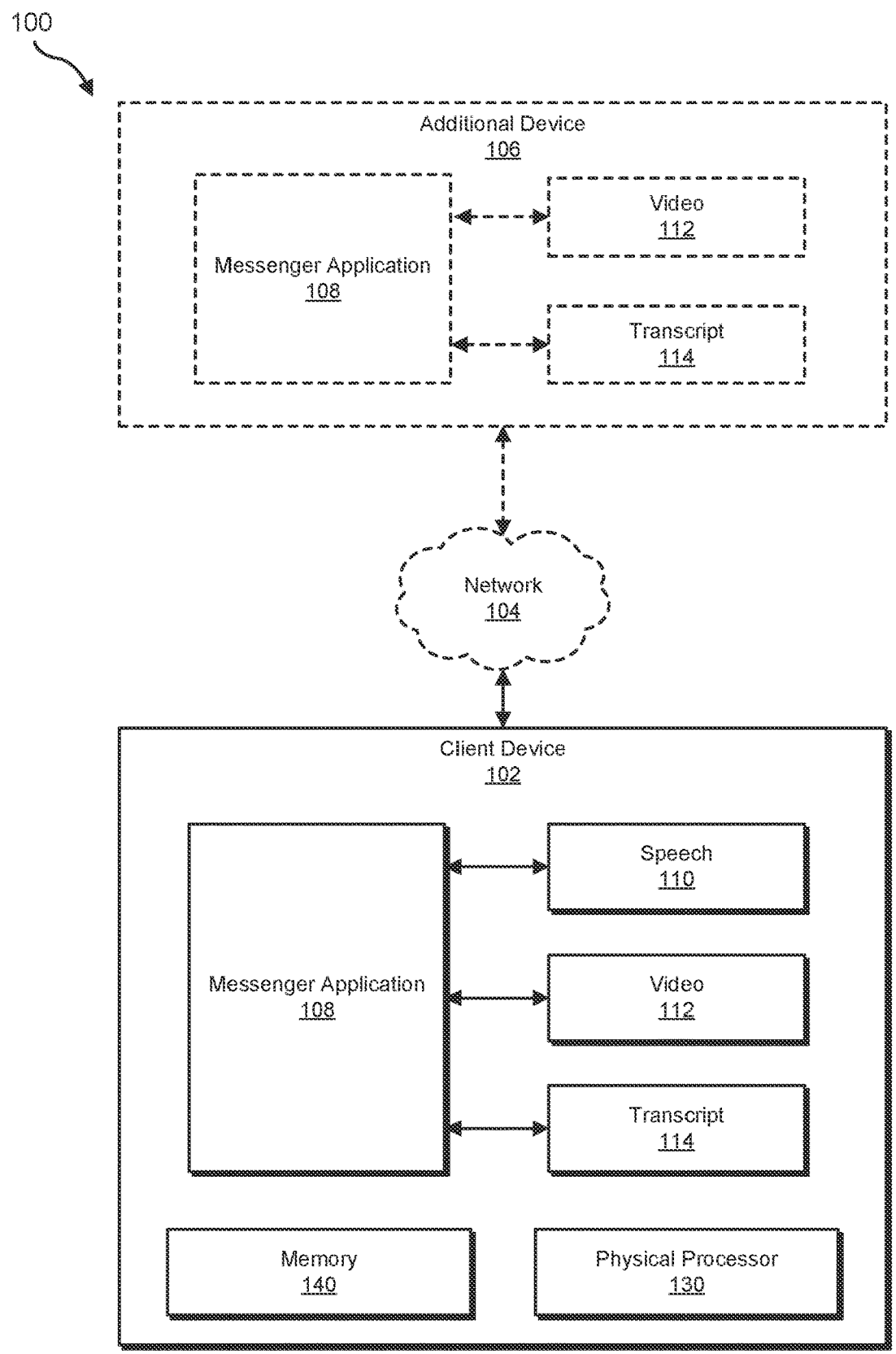
FIG. 1 is a block diagram of an exemplary system for securely captioning video calls.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

Features from any of the embodiments described herein may be used in combination with one another in accordance with the general principles described herein. These and other embodiments, features, and advantages will be more fully understood upon reading the following detailed description in conjunction with the accompanying drawings and claims.

DETAILED DESCRIPTION OF EXEMPLARY EMBODIMENTS

Video calls have become a ubiquitous means of communication, enabling users to speak to family, friends, and colleagues across the globe. However, for deaf and hard-of-hearing users or those with audio processing disorders, video calls may be less effective than text-based communication. Adding captions to video calls can improve the accessibility of these calls. By parsing speech and creating captions entirely client-side without sending the speech to a server for processing, the systems described herein may enable video calls with captioning to benefit from end-to-end encryption and other security features. In some embodiments, the systems described herein may create a temporary transcript of a call that is viewable by users during the call but deleted after the call ends. In some examples, the systems described herein may convey verbal emphasis with visual emphasis by bolding or increasing the size of words or phrases that are verbally emphasized by the speaker. By generating captions client-side and adding those captions to video calls, the systems described herein may efficiently and securely improve the accessibility of video calls.

In some embodiments, the systems described herein may improve the functioning of a computing device by enabling the computing device to generate text captions for speech during a video call. Additionally, the systems described herein may improve the fields of video calls and/or speech parsing by creating captions client-side rather than server-side, improving the security of captioned calls.

In some embodiments, the systems described herein may be implemented on a client device that communicates with an additional device (e.g., a server and/or another client device) via a network. FIG. 1 is a block diagram of an exemplary system 100 for securely captioning video calls. In one embodiment, and as will be described in greater detail below, a client device 102 may be configured with a messenger application 108 that detects speech 110 captured by a microphone of client device 102 as well as video 112 captured by a camera of client device 102. In some examples, messenger application 108 may parse speech 110 to create a transcript 114 and may transmit transcript 114 to an additional device 106 (e.g., via a network 104) for display to a user of an instance of messenger application 108 in combination with video 112. In one embodiment, additional device 106 may be an additional client device that hosts the instance of messenger application 108 while in another embodiment, additional device 106 may represent a server that transmits transcript 114 and/or video 112 to an additional client device that then displays transcript 114 in combination with video 112.

In embodiments where additional device 106 represents a server, additional device 106 may generally represent any type or form of backend computing device that may host and/or transfer data for a messenger application. Examples of a server may include, without limitation, application servers, database servers, and/or any other relevant type of server. Although illustrated as a single entity in FIG. 1, additional device 106 may include and/or represent a group of multiple servers that operate in conjunction with one another. In embodiments where additional device 106 represents a client device, additional device 106 may generally represent any type or form of computing device capable of reading computer-executable instructions.

Computing device 102 generally represents any type or form of computing device capable of reading computer-executable instructions. For example, computing device 102 may represent a personal computing device such as a smart phone. Additional examples of computing device 102 may include, without limitation, a laptop, a desktop, a wearable device, a smart device, an artificial reality device, a personal digital assistant (PDA), etc.

Messenger application 108 generally represents any software and/or hardware configured to facilitate video calls between two or more participants. In some embodiments, messenger application 108 may facilitate additional types of communication, such as text-based messages and/or audio calls. In one embodiment, instances of a messenger application may be installed on multiple client devices to enable those client devices to communicate with one another. In some embodiments, a server may host software that facilitates communication via a messenger application (e.g., transmitting data to and from client devices configured with the messenger application). In one embodiment, a messenger application may be configured with client-side captioning and/or encryption capabilities.

Speech 110 generally represents any word or collection of words uttered by a human and captured by the microphone of a computing device. In some embodiments, the systems described herein may capture and/or parse speech 110 in real time (e.g., as the speech is uttered). In one embodiment, the systems described herein may capture audio of speech and, at each pause in the speech, parse the recently captured audio for words and/or phrases. In some examples, speech 110 may include non-word sounds, such as guttural exclamations, humming, or onomatopoeia (e.g., a human imitating a cat's meow).

Video 112 generally represents any video captured by a camera of a recording device. In some examples, video 112 may include the speaker of speech 110. For example, video 112 may be a camera feed from a phone captures visual data of the user of the phone while a microphone of the phone captures audio data. In another example, video 112 may be the feed from a laptop or desktop webcam. In some examples, video 112 may be the live video feed of a user participating in a video call.

Transcript 114 generally represents any text-based representation of speech uttered by one or more people. In some embodiments, the systems described herein may create transcript 114 from speech 110 and then display some or all of transcript 114 as a caption alongside a video of speech 110 being uttered (e.g., video 112). In one embodiment, transcript 114 may be plain text. Additionally or alternatively, transcript 114 may include formatting and/or images. For example, transcript 114 may include formatting that emphasizes words that were spoken with verbal emphasis and/or images that indicate the tone and/or context of words (e.g., emoticons, musical notes, etc.). In some examples, transcript 114 may contain additional text besides the words that were spoken, such as the name of the speaker prepended to words spoken by that speaker and/or a description of non-word sounds uttered by the speaker (e.g., humming, mumbling, etc.).

As illustrated in FIG. 1, example system 100 may also include one or more memory devices, such as memory 140. Memory 140 generally represents any type or form of volatile or non-volatile storage device or medium capable of storing data and/or computer-readable instructions. In one example, memory 140 may store, load, and/or maintain one or more of the modules illustrated in FIG. 1. Examples of memory 140 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, and/or any other suitable storage memory.

As illustrated in FIG. 1, example system 100 may also include one or more physical processors, such as physical processor 130. Physical processor 130 generally represents any type or form of hardware-implemented processing unit capable of interpreting and/or executing computer-readable instructions. In one example, physical processor 130 may access and/or modify one or more of the modules stored in memory 140. Additionally or alternatively, physical processor 130 may execute one or more of the modules. Examples of physical processor 130 include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, and/or any other suitable physical processor.

Figure 2:
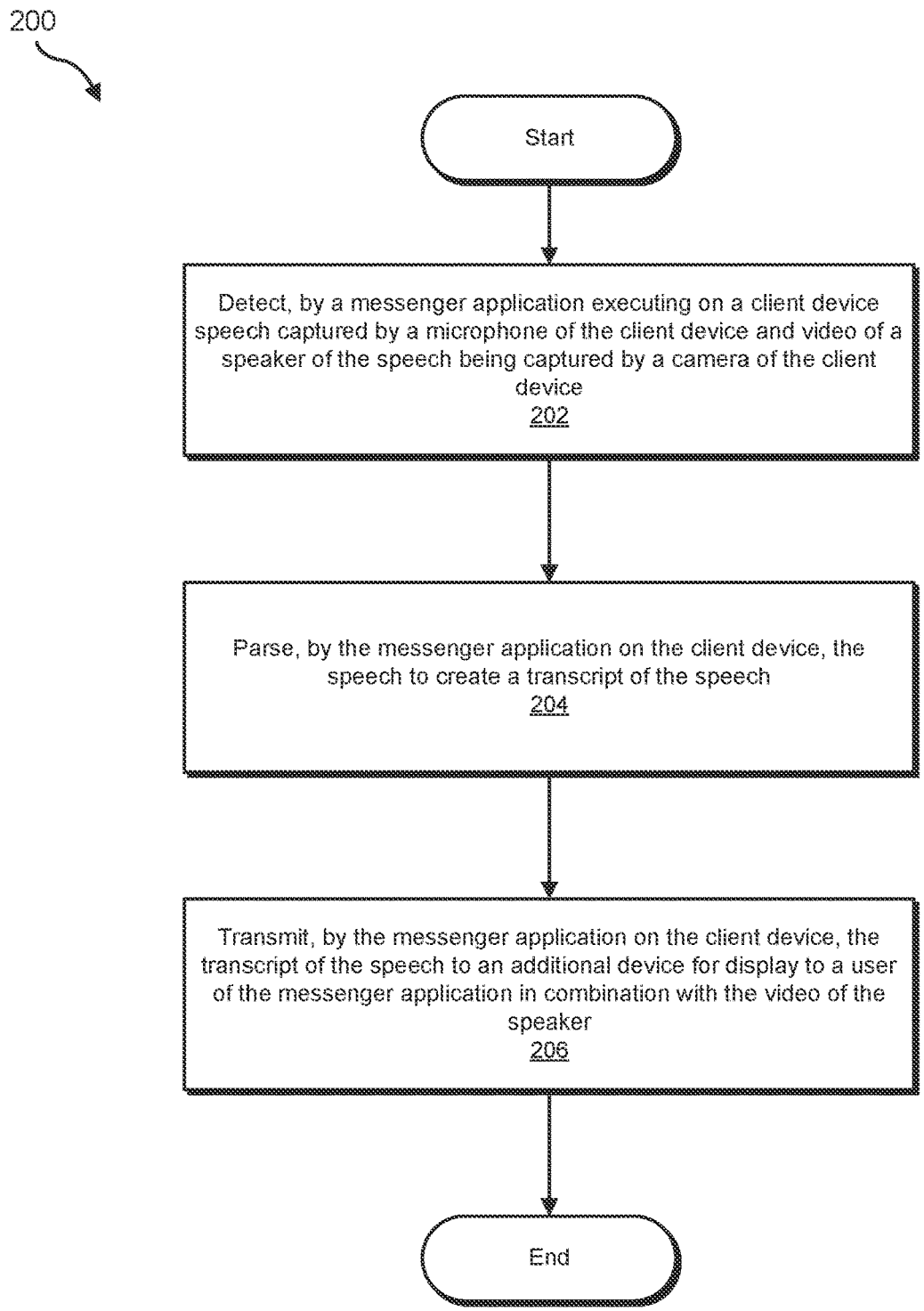
FIG. 2 is a flow diagram of an exemplary method for securely captioning video calls.

FIG. 2 is a flow diagram of an exemplary method 200 for securely captioning video calls. In some examples, at step 202, the systems described herein may detect, by a messenger application executing on a client device, speech captured by a microphone of the client device and video of a speaker of the speech being captured by a camera of the client device.

The systems described herein may detect the speech and video in a variety of ways and/or contexts. In some embodiments, the systems described herein may detect speech for potential captioning only if one or more participants in the video call has captioning turned on. In other embodiments, the systems described herein may always detect speech for captioning in preparation for a participant potentially turning on captioning. In some embodiments, the systems described herein may detect speech via a voice recognition algorithm that identifies the speaker of the speech.

In some examples, at step 204, the systems described herein may parse, by the messenger application on the client device, the speech to create a transcript of the speech. The systems described herein may parse the speech in a variety of ways. For example, the systems described herein may observe all audio input to the messenger application and may start a speech collecting process as soon as audio is observed. If a predetermined amount of time passes (e.g., 1 second. 0.5 seconds, etc.) with no audio input and/or with the audio input at too low of a volume (e.g., low enough that words are inaudible), the systems described herein may end the speech collecting process and parse the collected speech. If new audio input is detected, the systems described herein may start a new speech collecting process. For example, if a speaker says a sentence and then pauses briefly before the next sentence, the systems described herein may parse the two sentences as separate units. In some embodiments, the systems described herein may use a machine learning algorithm and/or model to parse speech. In one embodiment, the systems described herein may perform speech recognition in order to determine the identity of the speaker.

In some examples, at step 206, the systems described herein may transmit, by the messenger application on the client device, the transcript of the speech to an additional device for display to a user of the messenger application in combination with the video of the speaker. The systems described herein may transmit the transcript in a variety of ways and/or contexts. For example, the systems described herein may transmit the transcript to a server for further transmission to an additional client device that is configured with an instance of the messenger application and will display the transcript as a caption for the video. In some embodiments, the systems described herein may transmit the transcript and the video together.

In some embodiments, transmitting the transcript of the speech may include encrypting the transcript of the speech prior to transmitting an encrypted transcript of the speech from the client device to the additional device. Additionally, in some embodiments, the systems described may encrypt the video. Because the speech is parsed on the client device and not on the server, the video and transcript may be transmitted while encrypted such that the contents of the video and transcript are not visible to the server and are only visible to an additional client device with an appropriate decryption key.

Figure 3:
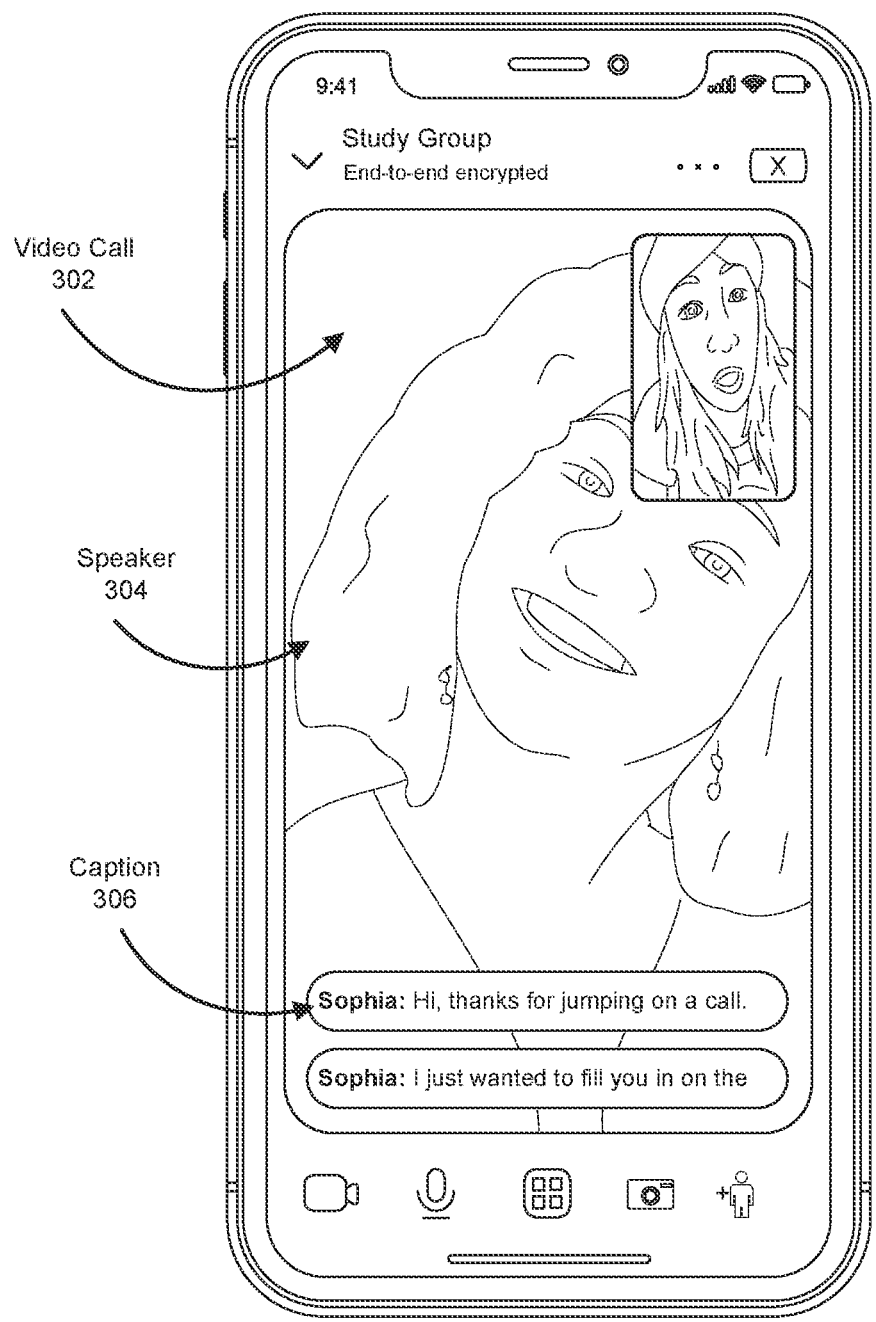
FIG. 3 is an illustration of an exemplary video call with captions.

In some embodiments, the systems described herein may receive a transcript of additional speech sent by the additional device and may display, in the messenger application on the client device, the transcript of the additional speech in combination with a video of the additional speaker of the additional speech. In one embodiment, the systems described herein may overlay the transcript over a portion of the video of the speaker whose speech is captioned. For example, as illustrated in FIG. 3, a messenger application may host a video call 302 that includes a video of a speaker 304. In one example, the systems described herein may parse the speech of speaker 304 and/or receive a transcript of parsed speech of speaker 304 and display a caption 306 of the speech over the video of speaker 304 during video call 302. In one embodiment, caption 306 may be a series of text bubbles at the bottom of the video that display captions of recently spoken speech. Alternatively, caption 306 may include as much text as fits in a predetermined caption area at the bottom of the video. In some embodiments, caption 306 may be styled to avoid confusion with text-based messages sent within the messenger application (e.g., with different visual formatting, positioning, and/or animation). In one embodiment, caption 306 may be displayed with text that has a high level of contrast compared to the background to improve readability.

Figure 4:
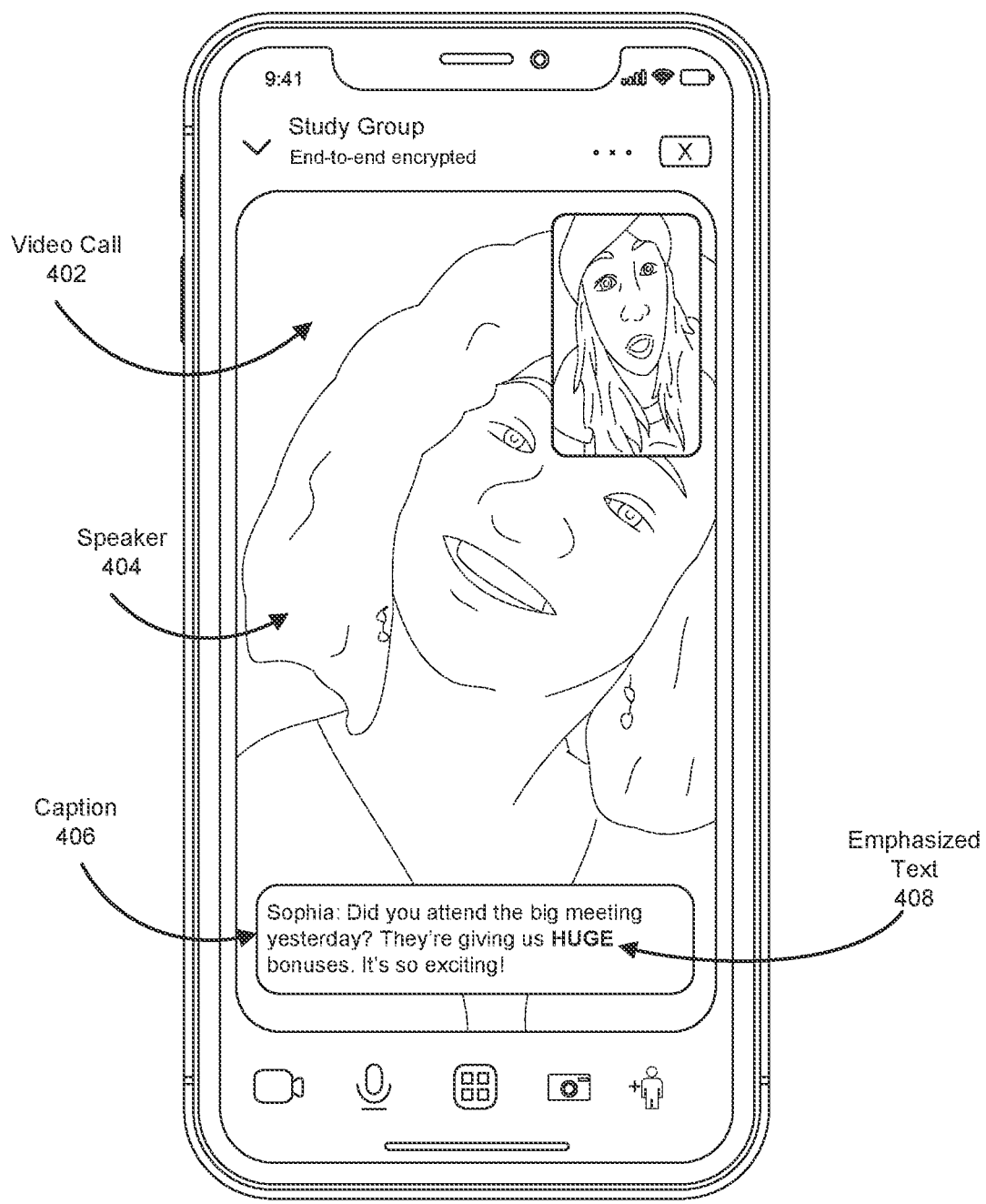
FIG. 4 is an illustration of an exemplary video call with captions that show emphasis.

In one embodiment, the systems described herein may parse the speech not just for words but also for verbal emphasis (e.g., volume, intonation, etc.) and may convey verbal emphasis via visual emphasis. In some examples, the systems described herein may display different words within the speech at different levels of visual emphasis corresponding to different levels of audio emphasis in the additional speech. For example, as illustrated in FIG. 4, a caption 406 for a video call 402 may include emphasized text 408 that is bold, larger, in a different color, and/or animated to reflect the verbal emphasis used by a speaker 404. In some examples, the systems described herein may display text corresponding to words spoken more quietly at a smaller size than words spoken at a normal volume.

Figure 5:
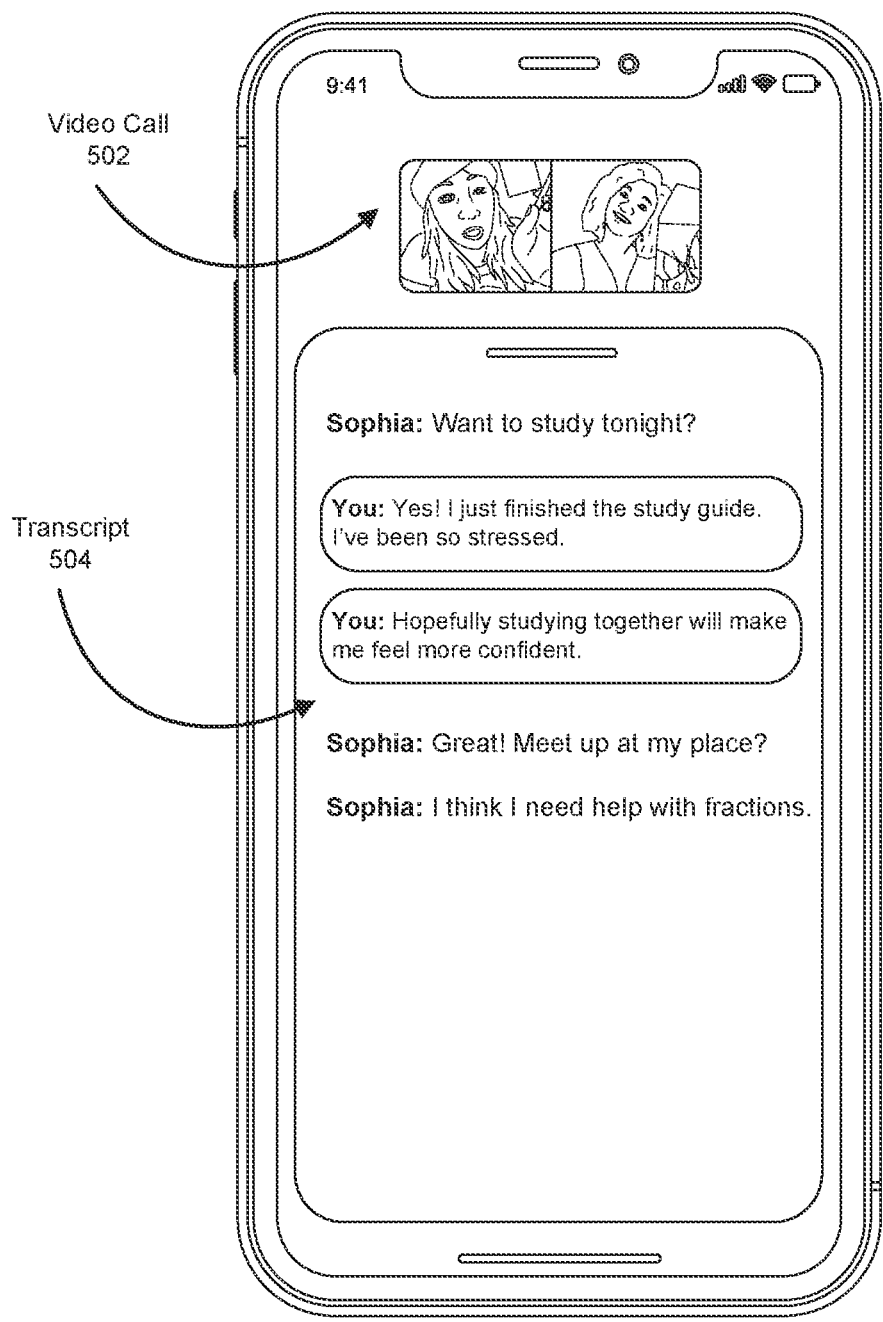
FIG. 5 is an illustration of an exemplary transcript of a video call.

In some embodiments, the systems described herein may generate and display a full transcript of all the speech parsed during a video call that can be viewed by participants in the video call at any time (e.g., as opposed to a caption that is only displayed for a few seconds). For example, as illustrated in FIG. 5, the systems described herein may generate a transcript 504 of a video call 502. In some embodiments, the systems described herein may display a user interface that shows smaller versions of the videos of participants in video call 502 alongside the text of transcript 504. In some embodiments, transcript 504 may label instances of speech with the speaker of the speech and/or format speech spoken by the user viewing transcript 504 differently from speech spoken by other users. In one embodiment, the systems described herein may only make transcript 504 available for viewing for the duration of video call 502 and/or may delete transcript 504 at the conclusion of video call 502.

Figure 6:
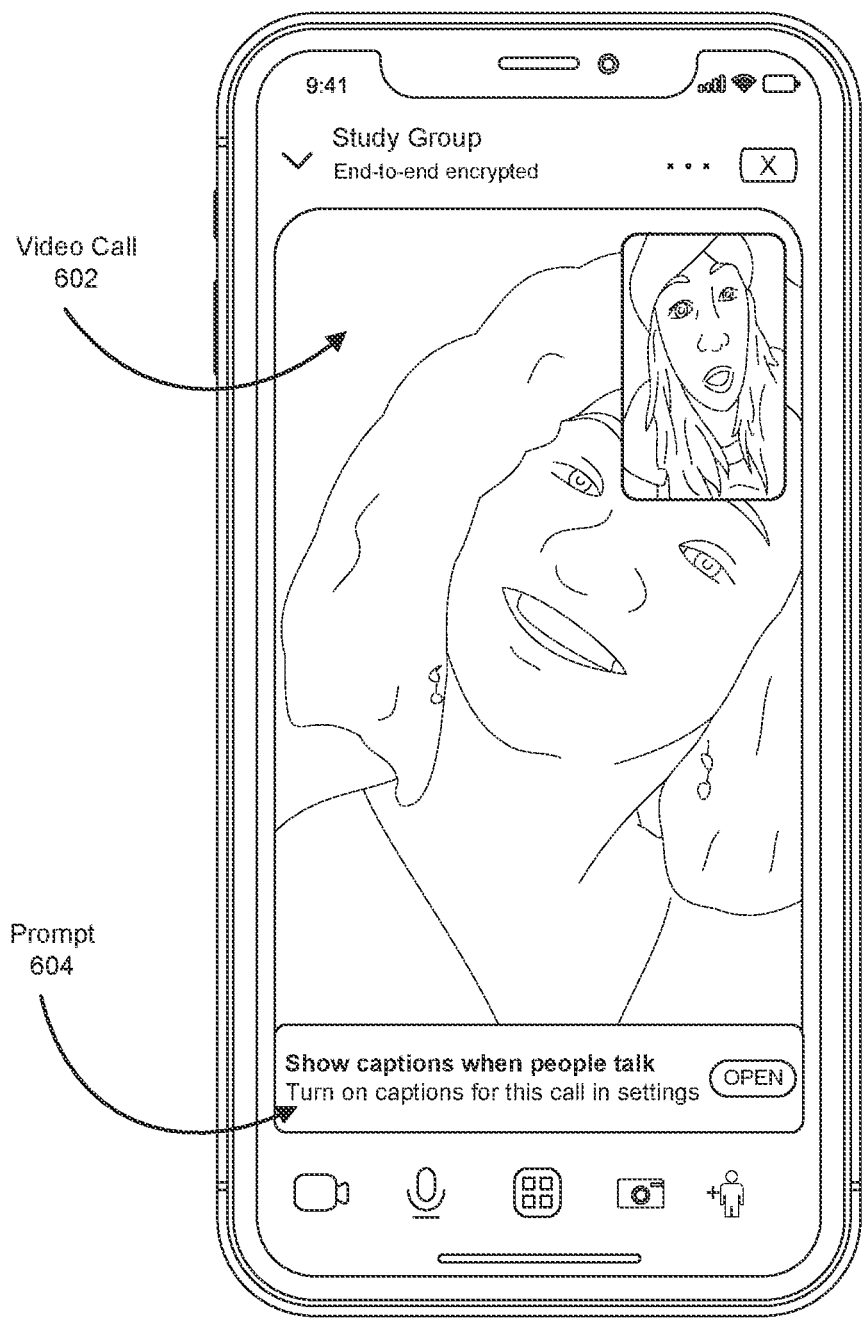
FIG. 6 is an illustration of an exemplary screenshot of a video call with captions.

In some examples, the systems described herein may display a prompt that enables a user to turn on captions for a video call hosted by the messenger application. For example, as illustrated in FIG. 6, the systems described herein may display a prompt 604 that enables a user to turn on captions for a video call 602. In one embodiment, the systems described herein may display the prompt in response to certain user actions, such as in response to detecting a user of the client device increasing an audio volume setting of the client device. In some examples, the systems described herein may display the prompt in response to detecting that a user has captions turned on in other applications (e.g., via receiving that information from an application programming interface for another application). In one embodiment, the systems described herein may only display the prompt once per call at most (e.g., even if a user increases the volume multiple times). In some embodiments, the systems described herein may enable a user to set a persistent toggle that turns captions on or off for all video calls hosted by the messenger application. In one embodiment, the persistent toggle may be part of an accessibility hub that hosts numerous accessibility settings for the messenger application and/or other applications.

Figure 7:
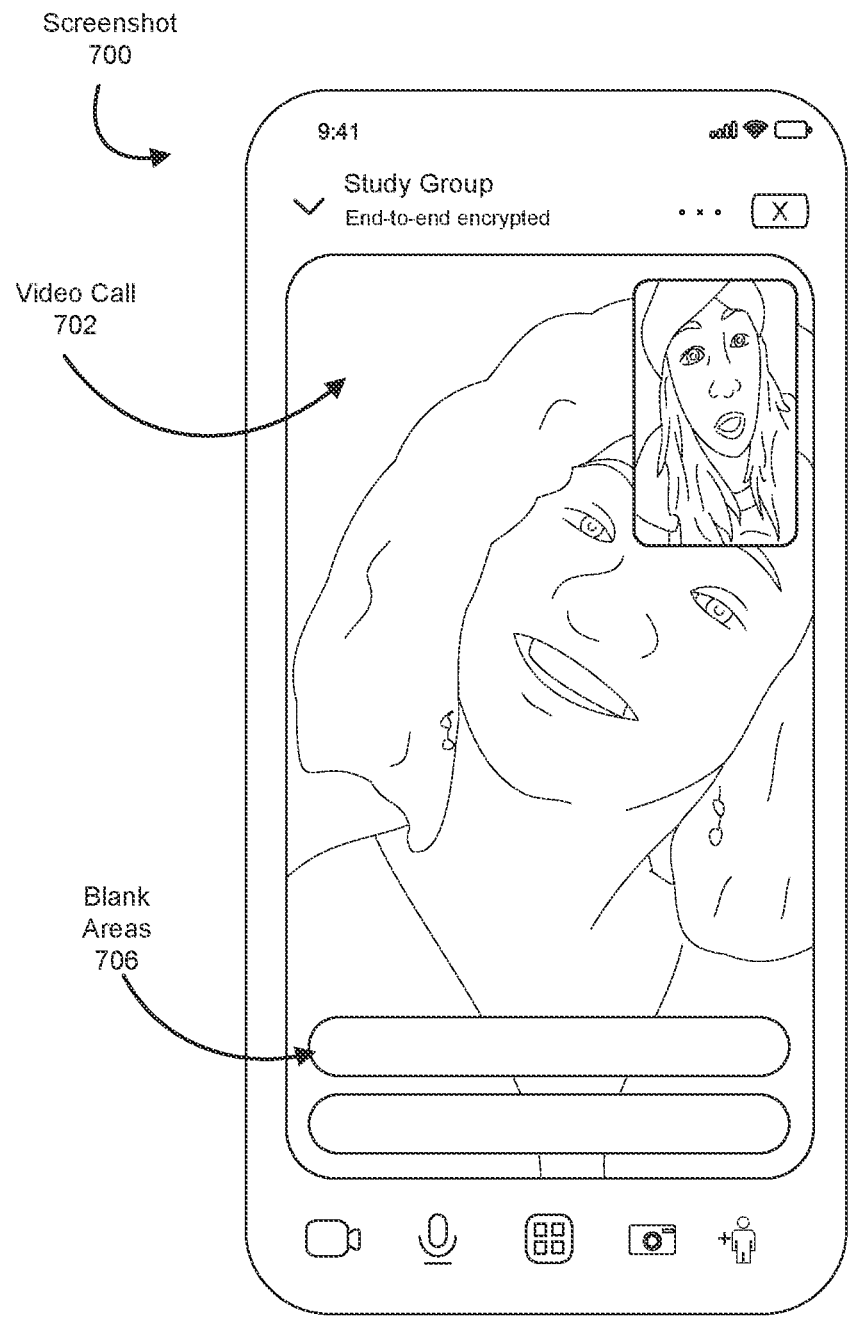
FIG. 7 is an illustration of an exemplary group video call with captions.

In some embodiments, to improve user privacy, the systems described herein may blank out captions in screenshots of the call. For example, as illustrated in FIG. 7, a screenshot 700 of a video call 702 may show a still image from the video and may show blank areas 704 where captions are displayed in video call 702. Similarly, the systems described herein may blank out and/or prevent screenshotting of a full transcript such as that shown in FIG. 5.

Figure 8:
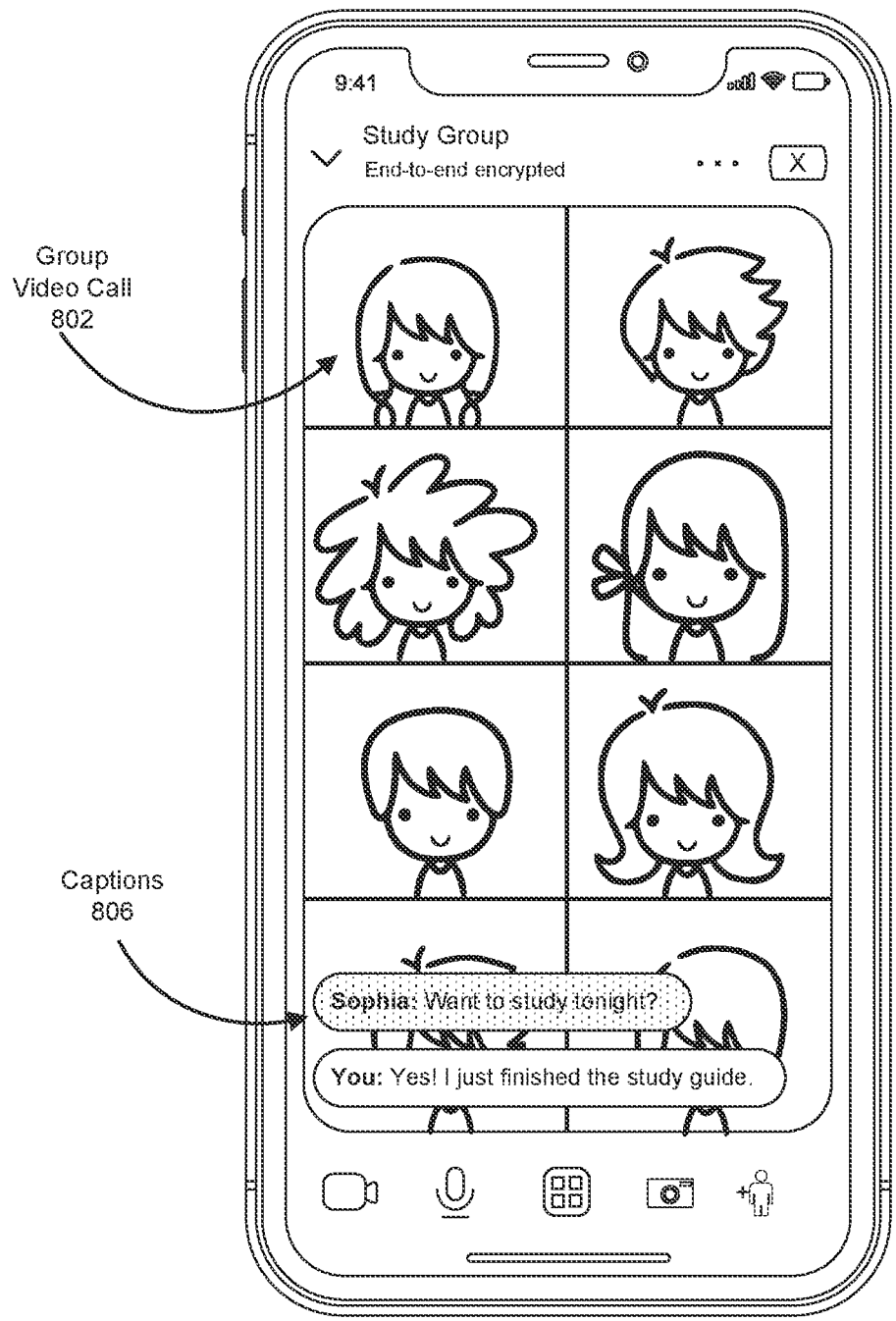
FIG. 8 is an illustration of an exemplary group video call with three or more participants.

In some examples, the systems described herein may securely caption a group video call that includes three or more participants. For example, as illustrated in FIG. 8, the systems described herein may create captions 806 for a group video call 802. In one embodiment, each client device participating in the call may send a transcript of the speech spoken by the user of that device to each other client device participating in the video call for display as a caption and the systems described herein may receive transcripts from multiple client devices for display alongside the video received from those devices. In some embodiments, the systems described herein may distinguish different speakers' captions visually, such as with different background colors, font colors, and/or fonts. In one embodiment, the caption of each speaker's text may be labelled with an identifier of the speaker, such as the speaker's name or username.

As described above, the systems and methods described herein may improve the accessibility of video calls by automatically adding captions to video calls for users with captioning turned on. By parsing the text of users' speech and creating captions on the client device rather than on a server, the systems described herein may prevent unencrypted forms of the users' speech from being sent to a server, enabling end-to-end encryption for captioned video calls and improve users' security and privacy.

EXAMPLE EMBODIMENTS

Example 1: A method for securely captioning video calls may include (i) detecting, by a messenger application executing on a client device, speech captured by a microphone of the client device and video of a speaker of the speech being captured by a camera of the client device, (ii) parsing, by the messenger application on the client device, the speech to create a transcript of the speech, and (iii) transmitting, by the messenger application on the client device, the transcript of the speech to an additional device for display to a user of the messenger application in combination with the video of the speaker.

Example 2: The computer-implemented method of example 1, where transmitting the transcript of the speech includes encrypting the transcript of the speech prior to transmitting an encrypted transcript of the speech from the client device to the additional device.

Example 3: The computer-implemented method of examples 1-2, where transmitting the transcript of the speech to the additional device includes transmitting the transcript of the speech to a server that transmits the transcript of the speech to an additional client device configured with the messenger application.

Example 4: The computer-implemented method of examples 1-3 may further include receiving, by the messenger application on the client device, a transcript of additional speech sent by the additional device and displaying, in the messenger application on the client device, the transcript of the additional speech in combination with a video of the additional speaker of the additional speech.

Example 5: The computer-implemented method of examples 1-4, where displaying the transcript of the additional speech includes overlaying the transcript over a portion of the video of the additional speaker.

Example 6: The computer-implemented method of examples 1-5, where displaying the transcript of the additional speech includes displaying a full transcript of a call that includes the transcript of the additional speech.

Example 7: The computer-implemented method of examples 1-6, where displaying the transcript of the additional speech includes displaying different words within the additional speech at different levels of visual emphasis corresponding to different levels of audio emphasis in the additional speech.

Example 8: The computer-implemented method of examples 1-7 may further include receiving, by the messenger application on the client device, a transcript of further additional speech sent by another additional device and displaying, in the messenger application on the client device, the transcript of the additional speech and the transcript of the further additional speech in combination with a video of the additional speaker and a video of a further additional speaker of the further additional speech.

Example 9: The computer-implemented method of examples 1-8 may further include detecting a user of the client device increasing an audio volume setting of the client device and, in response to detecting the user of the client device increasing the audio volume setting, prompting the user to turn on captioning for the messenger application.

Example 10: A system for securely captioning video may include at least one physical processor and physical memory including computer-executable instructions that, when executed by the physical processor, cause the physical processor to (i) detect, by a messenger application executing on a client device, speech captured by a microphone of the client device and video of a speaker of the speech being captured by a camera of the client device, (ii) parse, by the messenger application on the client device, the speech to create a transcript of the speech, and (iii) transmit, by the messenger application on the client device, the transcript of the speech to an additional device for display to a user of the messenger application in combination with the video of the speaker.

Example 11: The system of example 10, where transmitting the transcript of the speech includes encrypting the transcript of the speech prior to transmitting an encrypted transcript of the speech from the client device to the additional device.

Example 12: The system of examples 10-11, where transmitting the transcript of the speech to the additional device includes transmitting the transcript of the speech to a server that transmits the transcript of the speech to an additional client device configured with the messenger application.

Example 13: The system of examples 10-12, where the computer-executable instructions cause the physical processor to receive, by the messenger application on the client device, a transcript of additional speech sent by the additional device and display, in the messenger application on the client device, the transcript of the additional speech in combination with a video of the additional speaker of the additional speech.

Example 14: The system of examples 10-13, where displaying the transcript of the additional speech includes overlaying the transcript over a portion of the video of the additional speaker.

Example 15: The system of examples 10-14, where displaying the transcript of the additional speech includes displaying a full transcript of a call that includes the transcript of the additional speech.

Example 16: The system of examples 10-15, where displaying the transcript of the additional speech includes displaying different words within the additional speech at different levels of visual emphasis corresponding to different levels of audio emphasis in the additional speech.

Example 17: The system of examples 10-16, where the computer-executable instructions cause the physical processor to receive, by the messenger application on the client device, a transcript of further additional speech sent by another additional device and display, in the messenger application on the client device, the transcript of the additional speech and the transcript of the further additional speech in combination with a video of the additional speaker and a video of a further additional speaker of the further additional speech.

Example 18: The system of examples 10-17, where the computer-executable instructions cause the physical processor to detect a user of the client device increasing an audio volume setting of the client device and, in response to detecting the user of the client device increasing the audio volume setting, prompt the user to turn on captioning for the messenger application.

Example 19: A non-transitory computer-readable medium may include one or more computer-readable instructions that, when executed by at least one processor of a computing device, cause the computing device to (i) (i) detect, by a messenger application executing on a client device, speech captured by a microphone of the client device and video of a speaker of the speech being captured by a camera of the client device, (ii) parse, by the messenger application on the client device, the speech to create a transcript of the speech, and (iii) transmit, by the messenger application on the client device, the transcript of the speech to an additional device for display to a user of the messenger application in combination with the video of the speaker.

Example 19: The non-transitory computer-readable medium of example 19, where transmitting the transcript of the speech includes encrypting the transcript of the speech prior to transmitting an encrypted transcript of the speech from the client device to the additional device.

As detailed above, the computing devices and systems described and/or illustrated herein broadly represent any type or form of computing device or system capable of executing computer-readable instructions, such as those contained within the modules described herein. In their most basic configuration, these computing device(s) may each include at least one memory device and at least one physical processor.

In some examples, the term "memory device" generally refers to any type or form of volatile or non-volatile storage device or medium capable of storing data and/or computer-readable instructions. In one example, a memory device may store, load, and/or maintain one or more of the modules described herein. Examples of memory devices include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

In some examples, the term "physical processor" generally refers to any type or form of hardware-implemented processing unit capable of interpreting and/or executing computer-readable instructions. In one example, a physical processor may access and/or modify one or more modules stored in the above-described memory device. Examples of physical processors include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

Although illustrated as separate elements, the modules described and/or illustrated herein may represent portions of a single module or application. In addition, in certain embodiments one or more of these modules may represent one or more software applications or programs that, when executed by a computing device, may cause the computing device to perform one or more tasks. For example, one or more of the modules described and/or illustrated herein may represent modules stored and configured to run on one or more of the computing devices or systems described and/or illustrated herein. One or more of these modules may also represent all or portions of one or more special-purpose computers configured to perform one or more tasks.

In addition, one or more of the modules described herein may transform data, physical devices, and/or representations of physical devices from one form to another. For example, one or more of the modules recited herein may receive audio data to be transformed, transform the audio data to extract words or phrases, output a result of the transformation to create a text-based representation of the audio, use the result of the transformation to display captions, and store the result of the transformation to enable display of a transcript. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

In some embodiments, the term "computer-readable medium" generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the present disclosure. The embodiments disclosed herein should be considered in all respects illustrative and not restrictive. Reference should be made to the appended claims and their equivalents in determining the scope of the present disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method comprising:
    detecting, by a messenger application executing on a client device:
        speech captured by a microphone of the client device; and
        video of a speaker being captured by a camera of the client device;
    parsing, by the messenger application on the client device, the speech to create a transcript of the speech;
    transmitting, by the messenger application on the client device, the transcript of the speech to an additional device for display to a user of the messenger application in combination with the video of the speaker;
    displaying, in the messenger application on the client device, a transcript of additional speech in combination with a video of an additional speaker of the additional speech;
    determining a request for a screenshot of the messenger application while the video of the additional speaker is displayed; and
    causing the screenshot to be generated, wherein the display of the transcript is devoid of text in the screenshot.

2. The computer-implemented method of claim 1, wherein transmitting the transcript of the speech comprises encrypting the transcript of the speech prior to transmitting an encrypted transcript of the speech from the client device to the additional device.

3. The computer-implemented method of claim 1, wherein transmitting the transcript of the speech to the additional device comprises transmitting the transcript of the speech to a server that transmits the transcript of the speech to an additional client device configured with the messenger application.

4. The computer-implemented method of claim 1, further comprising:
    receiving, by the messenger application on the client device, the transcript of the additional speech sent by the additional device.

5. The computer-implemented method of claim 4, wherein displaying the transcript of the additional speech comprises overlaying the transcript over a portion of the video of the additional speaker.

6. The computer-implemented method of claim 4, wherein displaying the transcript of the additional speech comprises displaying a full transcript of a call that comprises the transcript of the additional speech.

7. The computer-implemented method of claim 4, wherein displaying the transcript of the additional speech comprises displaying different words within the additional speech at different levels of visual emphasis corresponding to different levels of audio emphasis in the additional speech.

8. The computer-implemented method of claim 4, further comprising:
   receiving, by the messenger application on the client device, a transcript of further additional speech sent by another additional device; and
   displaying, in the messenger application on the client device, the transcript of the additional speech and the transcript of the further additional speech in combination with a video of the additional speaker and a video of a further additional speaker of the further additional speech.

9. The computer-implemented method of claim 1, further comprising:
   detecting a user of the client device increasing an audio volume setting of the client device; and
   in response to detecting the user of the client device increasing the audio volume setting, prompting the user to turn on captioning for the messenger application.

10. A system comprising:
    at least one physical processor; and
    physical memory comprising computer-executable instructions that, when executed by the physical processor, cause the physical processor to:
       detect, by a messenger application executing on a client device:
          speech captured by a microphone of the client device; and
          video of a speaker of the speech being captured by a camera of the client device;
       parse, by the messenger application on the client device, the speech to create a transcript of the speech;
       transmit, by the messenger application on the client device, the transcript of the speech to an additional device for display to a user of the messenger application in combination with the video of the speaker;
       display, in the messenger application on the client device, a transcript of additional speech in combination with a video of an additional speaker of the additional speech;
       determine a request for a screenshot of the messenger application while the video of the additional speaker is displayed; and
       cause the screenshot to be generated, wherein the display of the transcript is devoid of text in the screenshot.

11. The system of claim 10, wherein transmitting the transcript of the speech comprises encrypting the transcript of the speech prior to transmitting an encrypted transcript of the speech from the client device to the additional device.

12. The system of claim 10, wherein transmitting the transcript of the speech to the additional device comprises transmitting the transcript of the speech to a server that transmits the transcript of the speech to an additional client device configured with the messenger application.

13. The system of claim 10, wherein the computer-executable instructions cause the physical processor to:
    receive, by the messenger application on the client device, the transcript of the additional speech sent by the additional device.

14. The system of claim 13, wherein displaying the transcript of the additional speech comprises overlaying the transcript over a portion of the video of the additional speaker.

15. The system of claim 13, wherein displaying the transcript of the additional speech comprises displaying a full transcript of a call that comprises the transcript of the additional speech.

16. The system of claim 13, wherein displaying the transcript of the additional speech comprises displaying different words within the additional speech at different levels of visual emphasis corresponding to different levels of audio emphasis in the additional speech.

17. The system of claim 13, wherein the computer-executable instructions cause the physical processor to:
    receive, by the messenger application on the client device, a transcript of further additional speech sent by another additional device; and
    display, in the messenger application on the client device, the transcript of the additional speech and the transcript of the further additional speech in combination with a video of the additional speaker and a video of a further additional speaker of the further additional speech.

18. The system of claim 10, wherein the computer-executable instructions cause the physical processor to:
    detect a user of the client device increasing an audio volume setting of the client device; and
    in response to detecting the user of the client device increasing the audio volume setting, prompt the user to turn on captioning for the messenger application.

19. A non-transitory computer-readable medium comprising one or more computer-readable instructions that, when executed by at least one processor of a computing device, cause the computing device to:
    detect, by a messenger application executing on the computing device:
       speech captured by a microphone of the computing device; and
       video of a speaker of the speech being captured by a camera of the computing device;
    parse, by the messenger application on the computing device, the speech to create a transcript of the speech;
    transmit, by the messenger application on the computing device, the transcript of the speech to an additional device for display to a user of the messenger application in combination with the video of the speaker;
    display, in the messenger application on the computing device, a transcript of additional speech in combination with a video of an additional speaker of the additional speech;
    determine a request for a screenshot of the messenger application while the video of the additional speaker is displayed; and
    cause the screenshot to be generated, wherein the display of the transcript is devoid of text in the screenshot.

20. The non-transitory computer-readable medium of claim 19, wherein transmitting the transcript of the speech comprises encrypting the transcript of the speech prior to transmitting an encrypted transcript of the speech from the computing device to the additional device.

* * * * *